US010487683B2

(12) United States Patent
Gerez et al.

(10) Patent No.: US 10,487,683 B2
(45) Date of Patent: Nov. 26, 2019

(54) SYSTEM FOR DETECTING AN EPHEMERAL EVENT ON A VANE IMPELLER OF AN AIRCRAFT ENGINE

(75) Inventors: Valerio Gerez, Yerres (FR); Serge Blanchard, Melun (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 1316 days.

(21) Appl. No.: 13/302,054

(22) Filed: Nov. 22, 2011

(65) Prior Publication Data

US 2012/0148400 A1    Jun. 14, 2012

(30) Foreign Application Priority Data

Nov. 26, 2010 (FR) ...................................... 10 59769

(51) Int. Cl.
| | | |
|---|---|---|
| F01D 25/00 | (2006.01) | |
| F01D 7/00 | (2006.01) | |
| F01D 21/04 | (2006.01) | |
| G01H 1/00 | (2006.01) | |
| F01D 21/00 | (2006.01) | |

(52) U.S. Cl.
CPC ............ *F01D 21/045* (2013.01); *F01D 21/04* (2013.01); *F01D 21/003* (2013.01); *G01H 1/006* (2013.01)

(58) Field of Classification Search
CPC ...... F01D 21/04; F01D 21/045; F03D 7/0024; Y02E 10/721; Y02E 10/723
See application file for complete search history.

(56) References Cited

U.S. PATENT DOCUMENTS

| | | | | |
|---|---|---|---|---|
| 4,413,519 A | * | 11/1983 | Bannister | ................ G01S 13/88 342/118 |
| 5,202,815 A | * | 4/1993 | Le Boennec | ...... H05K 7/20145 174/383 |
| 8,478,547 B2 | * | 7/2013 | Hadley | ................. F01D 21/003 702/34 |
| 2005/0122095 A1 | | 6/2005 | Dooley | |
| 2009/0099796 A1 | * | 4/2009 | Yang | ................... G06F 17/5018 702/56 |

(Continued)

FOREIGN PATENT DOCUMENTS

| | | |
|---|---|---|
| EP | 1 273 763 A2 | 1/2003 |
| EP | 1 538 448 A1 | 6/2005 |
| EP | 1 564 559 A1 | 8/2005 |

OTHER PUBLICATIONS

Przysowa et al., Health Monitoring of Turbomachinery Based on Blade Tip-Timing and Tip-Clearance,, Sep. 16, 2008, Air Force Institute of Technology—ITWL, pp. 14-1-14-8 (Year: 2008).*

(Continued)

*Primary Examiner* — Sujoy K Kundu
*Assistant Examiner* — L. Anderson
(74) *Attorney, Agent, or Firm* — Oblon, McClelland, Maier & Neustadt, L.L.P.

(57) ABSTRACT

A method and a system for monitoring an ephemeral event on a vane impeller of an aircraft engine are provided. The method includes: acquiring a time signal relating to movable vanes of the vane impeller; and detecting a disturbance in the time signal with respect to a reference time signal corresponding to a same flight phase, the disturbed time signal being indicative of an ephemeral event on said vane impeller. A system is provided to carry out this method.

16 Claims, 3 Drawing Sheets

(56) References Cited

U.S. PATENT DOCUMENTS

2009/0177433 A1    7/2009   Palmer et al.
2013/0211768 A1    8/2013   Gerez et al.

OTHER PUBLICATIONS

Cardwell et al., The Development And Testing Of A Gas Turbine Engine Foreign Object Damage (FOD) Detection System, Jun. 14-18, 2010, ASME Turbo Expo, 1-12 (Year: 2010).*
French Search Report dated Jul. 18, 2011, in French Patent Application No. FR 1059769 (FA 744040) (with Translation of Category of Cited Documents).
U.S. Appl. No. 13/878,107, filed Apr. 5, 2013, 2013-0211768, Gerez et al.
U.S. Appl. No. 14/575,096, filed Dec. 18, 2014, Gerez.

* cited by examiner

SYSTEM FOR DETECTING AN EPHEMERAL EVENT ON A VANE IMPELLER OF AN AIRCRAFT ENGINE

TECHNICAL FIELD

The present invention relates to the field of aircraft engine monitoring systems and more particularly, detection of ephemeral events on an aircraft engine vane impeller.

STATE OF PRIOR ART

An ephemeral event can correspond to a foreign object damage, a rotor-stator contact or an aero-acoustic phenomenon.

The foreign object damage (FOD) is the main cause for flight D&C (Delays and Cancellation). Indeed, in most cases, the shock is not perceived by the pilot during the flight and the discovery on the vane is made during checking of the plane just before retake-off.

Besides, a possible contact between the rotor and stator of an engine can cause a degradation in the vanes (for example, delamination, tears at the end of blades, wear) or the stator (for example wear of the coating). These degradations are detrimental to the vane service life or the engine performance.

Other ephemeral phenomena can relate to aero-acoustic type events, that are fortunately very unlikely, but which can nevertheless result in an accelerated aging of the vanes or blades.

A solution to the ephemeral events is to periodically disassemble the engine to check the vane state. However, this does not enable the event to be detected at the time it occurs and can possibly require a vibratory action-effect on the vanes, which may be detrimental if it is not perfectly checked. Moreover, periodical disassembly is costly and reduces the operating availability of the aircraft. Furthermore, avoiding a possible damage to the vanes as a result of an ephemeral event between two inspections is not ensured.

In order to solve this kind of problems, monitoring systems for detecting this kind of events are currently used. These detection systems make it possible to plan the checking and maintenance operations to be carried out and thus to improve the operating availability of the aircraft. They thus enable the maintenance costs to be reduced.

However, this generally requires several monitoring systems, each being dedicated for each specific phenomenon to be monitored, which is detrimental to the mass balance of the apparatus. Indeed, the design of each monitoring system requires specific and complex means to solve the different technical aspects of the monitoring related to each phenomenon resulting in high increases in masses and costs. Moreover, these systems do not enable the damaged components of the vane assembly to be identified.

A well-known monitoring system is described in patent application EP0284392. This system includes sensors provided in the aircraft for detecting the electrostatic charges generated by foreign objects passing through the engine.

This monitoring system is specific to the foreign object damage (FOD) and does not enable other ephemeral phenomena to be monitored. Furthermore, this system does not enable the potentially damaged vane(s) to be identified.

The object of the present invention is consequently to provide a monitoring system of simple implementation and which is able to monitor accurately and reliably ephemeral events without having the abovementioned drawbacks.

DESCRIPTION OF THE INVENTION

The present invention is defined by a system for monitoring an ephemeral event on a vane impeller of an aircraft engine, including:
  acquisition means for acquiring a time signal relating to movable vanes of the vane impeller,
  processing means for detecting a disturbance in said time signal with respect to a reference time signal corresponding to a same flight phase, the disturbed time signal being indicative of an ephemeral event on said vane impeller.

The system of the present invention enables to detect in real time and with great accuracy the occurrence of an ephemeral event by detecting any disturbance in the raw time signal in a simple way and with a minimum computing time.

According to one aspect of the present invention, the processing means are configured to analyse said disturbed time signal with respect to an angular reference to identify the impacted vane(s) of said vane impeller.

Thus, the damaged vane(s) can be identified with certainty and consequently, checking for the maintenance operations is made easier.

According to another aspect of the present invention, the processing means are configured to discriminate the nature of the ephemeral event by analysing the damping of said disturbance.

This enables all the ephemeral phenomena to be monitored and to indicate whether it is a FOD or an aero-acoustic event and consequently enables the planning of maintenance operations to be optimized and the costs thereof to be further reduced.

The monitoring system includes alerting means to indicate the occurrence of an ephemeral event. Thus, the maintenance technician can be very quickly informed about ephemeral events, their nature and possibly the impacted vanes to make maintenance easier.

Advantageously, the acquisition means include at least one tip-timing sensor (71) provided flush with said vane impeller for acquiring a time signal indicative of a current passage time between the vanes.

The present invention utilized the tip-timing method (usually used in test benches) to use it on board in an operating engine in order to compare the travel of vanes with respect to normal to be able to detect any occurrence of an ephemeral event. Thus, the tip-timing sensor is herein used to merely compare the passage of vanes with a reference state rather than to measure frequencies thus enabling the computing time to be optimized while providing an accurate, relevant and quick detection.

The acquisition means can include a phonic wheel integral with the vane impeller and a top tour sensor provided facing the phonic wheel to provide an angular reference of the vanes of said vane impeller.

Alternatively, the vane wheel includes a vane having a singularity and the tip-timing sensor is configured to provide an angular reference of the vanes of said vane impeller. This enables the use of a phonic wheel and a top tour sensor to be eliminated and thus the volume and the mass of the engine to be optimized.

Advantageously, the tip-timing sensor is configured to measure the engine speed of the aircraft. Thus, the tip-timing sensor can also replace a speed measuring device enabling the mass balance of the aircraft to be further optimized.

The tip-timing sensor can also be configured to measure possible deflections at the top of the vanes and that the processing means can be configured to monitor the proper state of the vanes depending on the measurements performed by said tip-timing sensor. Thus, the tip-timing sensor can be efficiently used to monitor the proper state of the vanes.

Advantageously, the tip-timing sensor is of a capacitive and/or eddy current type. This kind of sensors is accurate, robust and not very cumbersome.

The processing means can be integrated in a specific box or in an existing electronic box.

The invention also aims at a method for monitoring an ephemeral event on a vane impeller of an aircraft engine, including the following steps of:
  acquiring a time signal relating to movable vanes of the vane impeller,
  detecting a disturbance in said time signal with respect to a reference time signal corresponding to a same flight phase, the disturbed time signal being indicative of an ephemeral event on said vane impeller.

The invention also aims at a computer program including instructions for implementing the method according to the above characteristics when run on a computer.

BRIEF DESCRIPTION OF THE DRAWINGS

Further characteristics and advantages of the invention will appear upon reading preferable embodiments of the invention made in reference with the appended figures wherein.

DETAILED DESCRIPTION OF PARTICLE EMBODIMENTS

The idea underlying the invention is to utilize disturbances in a time signal during an ephemeral event.

Figure 1:
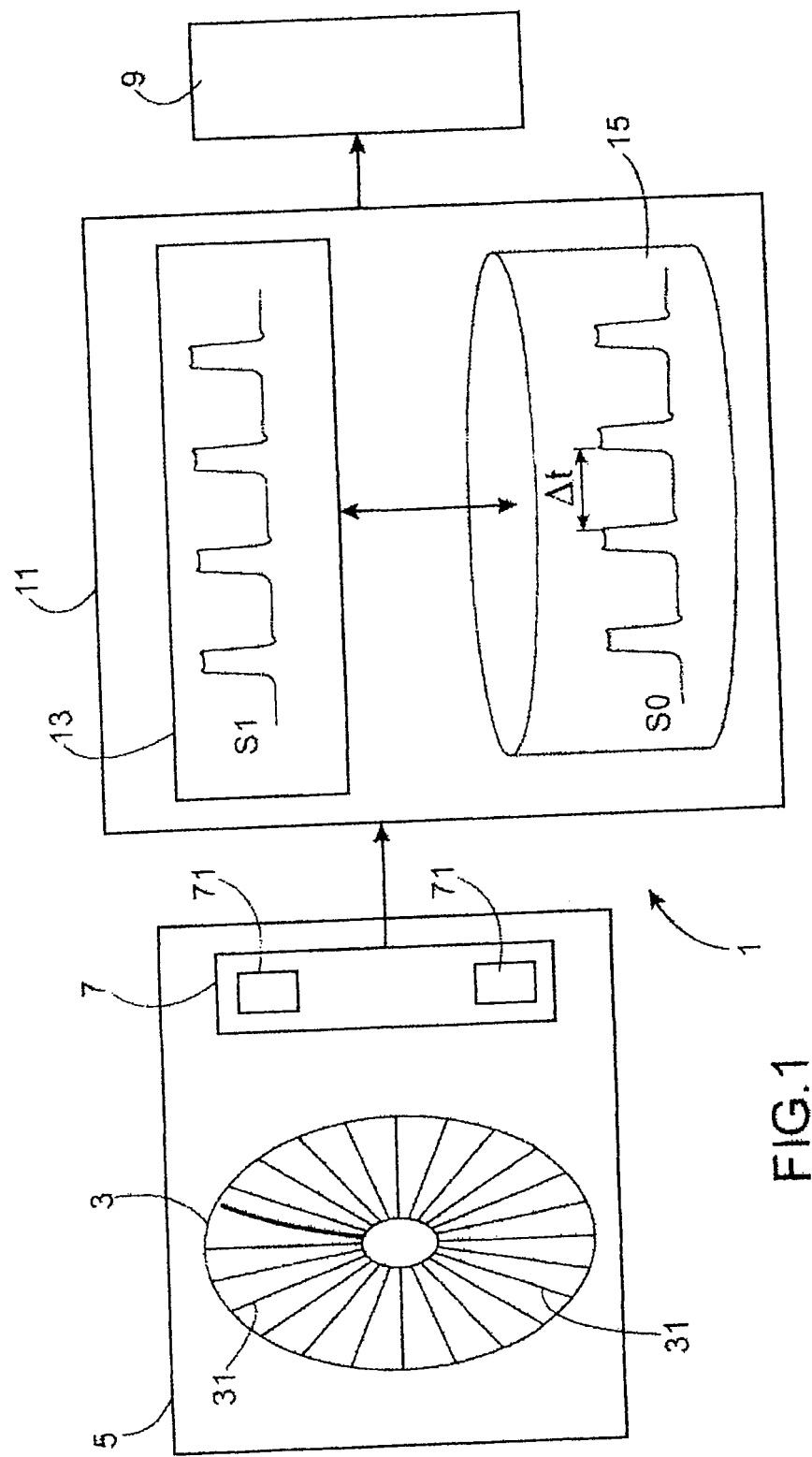
FIG. 1 schematically illustrates a system for monitoring an ephemeral event on a vane impeller of an aircraft engine according to the invention.

FIG. 1 schematically illustrates a system 1 for monitoring an ephemeral event on a vane impeller (or a vane assembly) 3 of an aircraft engine 5, according to the invention.

This system 1 includes data acquisition means 7, alerting means 9 and processing means 11 such as a calculator or computer comprising computing means 13 and storing means 15. The processing means 11 are configured to run a computer program comprising code instructions designed to implement an acquisition, signal processing, analysis and alerting algorithm according to the monitoring method of the invention.

The processing means 11 can be integrated in a specific box or an existing electronic box. For example, the processing means 11 can be part of a calculator or more particularly, of the digital controlling device of the ECU (Engine control unit).

In accordance with the invention, the acquisition means 7 are configured to acquire a time signal S1 relating to movable vanes 31 of a vane impeller 3, for example the vane impeller of the fan or any other vane impeller of the engine 5. Further, the processing means 11 are configured to detect a disturbance in the time signal S1 with respect to a reference time signal S0 corresponding to a same flight phase.

It will be noted that the reference time signal S0 is a pre-recorded safe time signal according to the same concurrent context or operating mode of the engine 5. The occurrence of a shock or any other ephemeral event on the vane impeller 3 generates a vibration on one or more vanes 31, which changes or disturbs the time signal S1. Thus, the resulting disturbed time signal is a representation which gives information about the ephemeral event which occurred on the vane impeller 3. Consequently, when the processing means 11 detect a disturbed time signal, an alert indicating the occurrence of the ephemeral event is sent to the warning or outputting means 9 (comprising for example sound and/or viewing means). Moreover, messages to be sent or to be made available for maintenance can be triggered by the detection of the ephemeral event.

Advantageously, the monitoring system 1 utilizes a tip-timing technique to detect ephemeral events. Usually, this technique is used in test benches to measure vibrations in movable vanes from the fixed space.

Thus, in accordance with the invention, the acquisition means 7 integrated in the operating aircraft engine 5, include at least one tip-timing sensor 71 provided on the casing of the engine 5 flushed with the vane impeller 3 to acquire the time signal S0 or S1.

More particularly, the tip-timing sensor 71 detects and counts the passage of the vanes 31 with respect to a time base. Thus, the tip-timing sensor 71 can measure the current passage time between the vanes 31 with respect to a reference point.

In a normal operation, without any vibration, the vanes 31 will pass regularly in front of the tip-timing sensor 71 and the time interval Δt measured between the passage of two consecutive vanes is constant at a given speed.

Thus, when the engine 5 is new (or repaired), one or more acquisitions are carried out to define a reference time signal S0 as a safe engine reference base for each flight phase of the aircraft.

In real time, the processing means 11 compare the time signal S1 of the vane impeller 3 in the flight phase in which it is situated with respect to the corresponding reference time signal, in order to detect any possible disturbance in the signal. The disturbance is reflected by a change in the vane position when it passes in front of the sensor 71 with respect to its reference position, which is indicative of an ephemeral event.

Advantageously, the acquisition means 7 include several tip-timing sensors 71 provided flush with the vane impeller 3. The number of sensors 71 increases the detection ability.

In particular, if it happens that in normal operation, the vane assembly 3 vibrates at a given speed, the concerned vane(s) will have at this speed not a moment but a passage interval corresponding to the vibration. Thus, if the vibration is harmonic, the vane will always be in the same position when it passes in front of the sensor 71 and consequently, in the case of a single sensor, the vibration will not be perceived in absolute terms, without comparison to the reference signal S0. To make up for this drawback, a second tip-timing sensor 71, the angular location of which is different from 180° with respect to the first sensor is advantageously used.

According to an advantageous aspect of the present invention, the processing means 11 are configured to discriminate the nature of the ephemeral event by analysing the damping of the disturbance.

Indeed, in the case of a shock on a vane, the latter vibrates on its own modes, and this vibration is damped in a few engine revolutions.

However, in case of sustained vibration on one or several vanes, the vibration can continue on several engine revolutions.

Thus, the processing means 11 are configured to indicate that the ephemeral event is a FOD if the disturbance is damped at the end of a determined number of revolutions of the vane impeller 3. In the opposite case, that is if the disturbance is not damped at the end of the determined number of revolutions, the processing means 11 indicate that the ephemeral event is an aero-acoustic phenomenon.

According to another advantageous aspect of the present invention, the processing means 11 are configured to analyse the disturbed time signal with respect to an angular reference to identify the vibrated or impacted vane(s) of the vane impeller.

The angular reference can be provided by a top-tour sensor provided facing a phonic wheel integral with the vane impeller.

Figure 2:
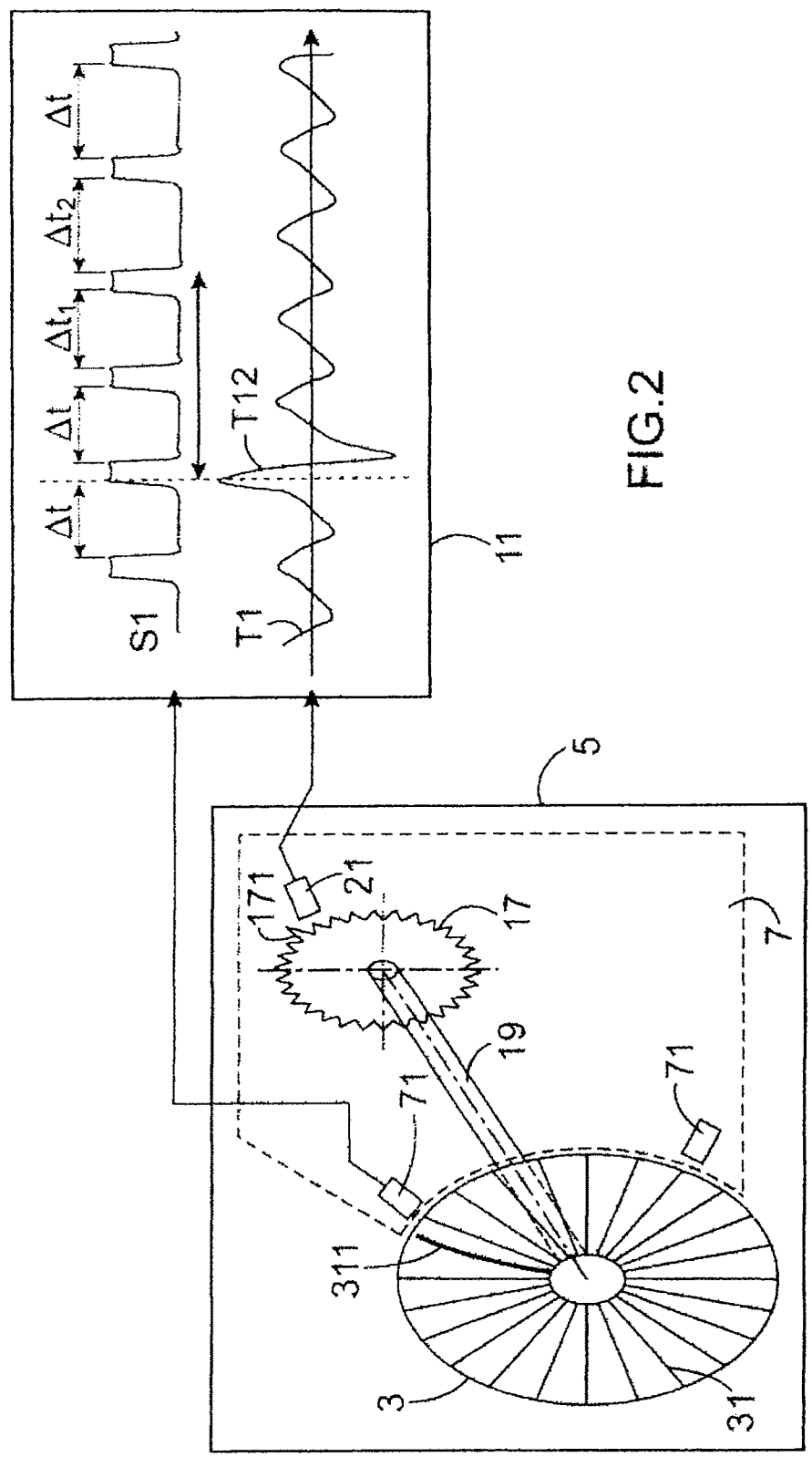
FIG. 2 schematically illustrates a phonic wheel coupled to the vane impeller of the monitoring system of FIG. 1.

Indeed, FIG. 2 illustrates a phonic wheel 17 coupled to the vane impeller 3.

The phonic wheel 17 is integral with the engine shaft 19, in turn integral with the vane impeller 3 and thus rotates at the same speed of the latter. One of the teeth 171 of the phonic wheel 17 has a different shape from the others (for example longer) to enable the top-tour sensor 12 to have an angular reference.

More particularly, FIG. 2 illustrates the signal T1 of the phonic wheel 17 with a top-tour pulse T12 in correspondence with the time signal S1 from the tip-timing sensor 71. By comparing both signals, the processing means 11 can identify with great accuracy the vibrating vane 311 (for example, impacted by a FOD).

It will be noted that the engine 5 usually includes a phonic wheel 17 to measure the engine speed with a top-tour sensor 21 in order to identify unbalancing masses. Thus, the monitoring system according to the invention utilizes the existing phonic wheel with its top-tour to identify the impacted vane.

Alternatively, the angular reference can be generated by one of the tip-timing sensors 71 and a singularity on one vane of the vane impeller itself. This singularity can correspond to a vane having a different length or width from other vanes, or having a specific shape or a specific adjoined material, etc.

Advantageously, one of the tip-timing sensors 71 can also be used to measure the engine speed of the aircraft.

Furthermore, the tip-timing sensor 71 can be used to measure possible deflections or clearances at the top of the vanes 31. This enables the processing means 11 to monitor the proper state of the vanes 31 depending on the measurements carried out by the tip-timing sensor 71.

By way of example, the tip-timing sensor 71 can be a capacitive type. The capacitive sensors are robust, accurate, not very bulky and require no specific washings.

According to another example, the tip-timing sensor 71 can be an eddy current sensor which is also very robust, very accurate and not very bulky.

Figure 3:
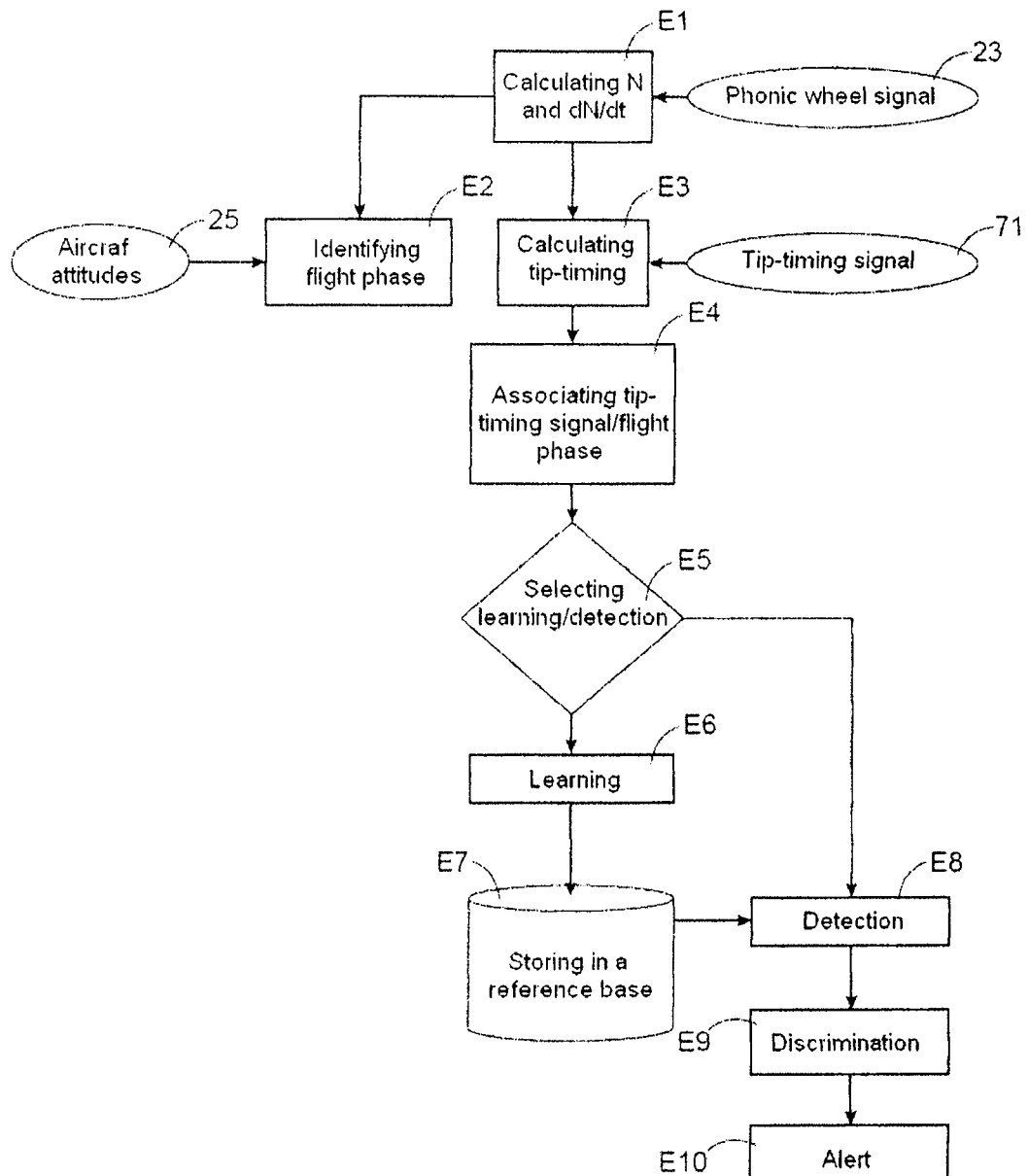
FIG. 3 is a flowchart according to a particular embodiment of the invention illustrating the steps of a method for monitoring an ephemeral event on a vane impeller of an aircraft engine, according to the invention.

FIG. 3 is a flowchart illustrating an exemplary method for monitoring an ephemeral event on a vane impeller 3 of an aircraft engine 5, according to the invention.

Steps E1 to E4 relate to the determination of a time signal S0 or S1 according to the current operation mode of the engine 5.

More particularly, in step E1, the processing means 11 calculate the engine speed N and the acceleration or deceleration dN/dt from measurements acquired by a speed measuring device 23. This device 23 can correspond to a top-tour sensor 21 in association with a phonic wheel 17 or a tip-timing sensor 71 in association with a singularity on a vane of the vane impeller 3.

In step E2, the processing means 11 identify the current flight phase (or the current operation mode of the engine) from data about the speed and acceleration of the engine as well as flight parameters including altitude and attitude of the aircraft received from an air data and inertial reference system (ADIRS) 25 of the aircraft.

It will be noted that an on-board engine always operates the same way according to well-defined flight phases including the following phases: engine start, taxi, take-off, climb, cruise, approach, landing, reverse and engine shut down. Thus, the operation modes of the engine can be easily identified by simple enough indicators according to elementary criteria such as engine speed, altitude and attitudes of the aircraft.

In step E3, the processing means 11 perform a tip-timing processing from the data acquired by the tip-timing sensor(s) 71 flush with the vane impeller(s) 3.

In step E4, the processing means 11 identify the time signal S0 or S1 relating to the vane impeller 3 according to the context (that is, depending on the current operation mode of the engine).

In step E5, it is indicated whether we are in learning mode or in detection mode. In the first case, we go to step E6 and otherwise, we go to step E8.

Indeed, if in learning (or calibration) mode, the processing means 11 define in step E6 the reference time signal S0 corresponding to each flight phase of the aircraft.

Then, in step E7, reference time signals according to the different contexts form a reference base which is stored in the storing means 15. Thus, to fill this reference base, it only takes a signal to the algorithm that the task to come will be a dedicated flight. It will be noted that during the engine life, the reference base should not vary except for a degradation or shock in one or more vanes 31.

On the other hand, in step E8 (that is, in detection or running mode), the processing means 11 compare in real time the time signal S1 of the vane impeller 3 in the flight phase in which it is situated, with respect to the corresponding reference signal S0, in order to detect a possible disturbance representative of an ephemeral event.

For example, in the case of a shock on a vane 311, this vibrates on its own modes and the vibration is damped in a few engine revolutions. In the case of a sustained vibration on one or more vanes, the vibration can continue on several engine revolutions.

Whether it is sustained or not, this vibration results in a change in the position of the vane with respect to the top-tour T12 at the time when it passes in front of the tip-timing sensor 71, which enables it to be easily identified. This identification relies on the detection of any interval $\Delta t$ which would deviate from normal (that is from the reference base), the characteristics thereof being constituted during the first flights without incident (refer to steps E5-E7) and stored in the storing means 15.

By way of example, FIG. 2 shows that the pulse corresponding to the third vane with respect to the top-tour T12 is spaced apart from the preceding and following pulses by intervals Δt1 and Δt2 different from the constant interval Δt. This clearly indicates that the third vane has undergone an ephemeral event.

Thus, the signal processing performed by the processing means 11 enables, by comparison to the reference base, the abnormality on the vane which has undergone a possible damage to be identified and an alert to be generated.

Further, in step E9, the processing means 11 are configured to discriminate the vane in free oscillations (impact of a FOD) of the vane in forced oscillations (aero-acoustic phenomenon). To do so, the algorithm follows up over the course of time the vane in oscillations in order to determine if the amplitude of the phenomenon is damped over the course of time until it disappears or if it continues after a predetermined number of engine revolutions. Thus, two types of alerts could then be emitted: FOD or aero-acoustic phenomenon.

In step E10, the processing means 11 emit an alerting message via the alerting means 9 in the case where an ephemeral event has been asserted. It will be noted that the alert can be triggered by the processing means 11 in the case where the disturbance in the time signal S1 exceeds the predetermined threshold.

Further, the alerting message can include an identification of the vane(s) possibly damaged as well as the nature of the ephemeral event.

The invention claimed is:

1. A system for monitoring an ephemeral event on a vane impeller of an aircraft engine, comprising:
    acquisition means for acquiring a time signal relating to movable vanes of the vane impeller during a flight phase of the aircraft engine, wherein the acquisition means includes at least one tip-timing sensor provided flush with said vane impeller for acquiring the time signal; and
    processing means for detecting a disturbance in said time signal by comparing said disturbed time signal acquired during the flight phase to a reference time signal corresponding to a same flight phase, the disturbed time signal being indicative of an ephemeral event on said vane impeller,
    wherein the processing means is configured to analyze said disturbed time signal with respect to an angular reference to identify an impacted vane of said vane impeller,
    wherein the time signal is indicative of a current passage of time between the vanes,
    wherein the ephemeral event is a foreign object damage, a rotor-stator contact, or an aero-acoustic phenomenon, and
    wherein the system further comprises alerting means for, in response to the detection of the disturbance, indicating the ephemeral event and for identifying the impacted vane to a user for further assessment by the user of the vane impeller.

2. The monitoring system according to claim 1, wherein the processing means is configured to discriminate a nature of the ephemeral event by analyzing damping of said disturbance.

3. The monitoring system according to claim 1, wherein the acquisition means includes a phonic wheel integral with the vane impeller and a top tour sensor provided facing the phonic wheel to provide an angular reference of the vanes of said vane impeller.

4. The monitoring system according to claim 1, wherein the vane impeller includes a vane having a singularity and the tip-timing sensor is configured to provide an angular reference of the vanes of said vane impeller.

5. The monitoring system according to claim 1, wherein the tip-timing sensor is configured to measure an engine speed of the aircraft.

6. The monitoring system according to claim 1, wherein the tip-timing sensor is configured to measure possible deflections at a top of the vanes and the processing means is configured to monitor a proper state of the vanes depending on measurements performed by said tip-timing sensor.

7. The monitoring system according to claim 1, wherein the tip-timing sensor is at least one of a capacitive and an eddy current type.

8. The monitoring system according to claim 1, wherein the processing means is integrated in a specific box or in an existing electronic box.

9. The monitoring system according to claim 1, wherein the reference time signal is a pre-recorded safe time signal corresponding to a same operating mode of the aircraft engine as an operating mode of the engine at which said disturbed time signal is acquired.

10. The monitoring system according to claim 1, wherein the acquisition means includes plural tip-timing sensors provided flush with said vane impeller.

11. The system according to claim 1, wherein the processing means is configured to identify the flight phase of the aircraft engine based on a measured speed and acceleration of the aircraft engine and is configured to detect the disturbance based on the identified flight phase.

12. A method for monitoring an ephemeral event on a vane impeller of an aircraft engine, comprising:
    acquiring a time signal relating to movable vanes of the vane impeller during a flight phase of the aircraft engine, wherein the acquiring is performed by at least one tip-timing sensor provided flush with said vane impeller for acquiring the time signal;
    detecting a disturbance in said time signal by comparing said disturbed time signal acquired during the flight phase to a reference time signal corresponding to a same flight phase, the disturbed time signal being indicative of an ephemeral event on said vane impeller; and
    emitting an alert if the disturbance is detected in said time signal,
    wherein the detecting includes analyzing said disturbed time signal with respect to an angular reference to identify an impacted vane of said vane impeller,
    wherein the time signal is indicative of a current passage of time between the vanes,
    wherein the ephemeral event is a foreign object damage, a rotor-stator contact, or an aero-acoustic phenomenon, and
    wherein the method further comprises, in response to the detection of the disturbance, indicating the ephemeral event and identifying the impacted vane to a user for further assessment by the user of the vane impeller.

13. A non-transitory computer readable medium including computer executable instructions for executing the method according to claim 12 when executed by a computer.

14. A system for monitoring an ephemeral event on a vane impeller of an aircraft engine, comprising:
    a sensor which acquires a time signal relating to movable vanes of the vane impeller during a flight phase of the aircraft engine, wherein the sensor includes at least one tip-timing sensor provided flush with said vane impeller for acquiring the time signal; and a processor configured to detect a disturbance in said time signal by comparing said disturbed time signal acquired during the flight phase to a reference time signal corresponding to a same flight phase, the disturbed time signal being indicative of an ephemeral event on said vane impeller, wherein the processor is configured to analyze said disturbed time signal with respect to an angular reference to identify an impacted vane of said vane impeller, and wherein the time signal is indicative of a current passage of time between the vanes, wherein the ephemeral event is a foreign object damage, a rotor-stator contact, or an aero-acoustic phenomenon, and wherein the system further comprises an indicator configured to, in response to the detection of the disturbance, indicate the ephemeral event and to identify the impacted vane to a user for further assessment by the user of the vane impeller.

15. The system according to claim 14, wherein the processor is configured to identify the flight phase of the aircraft engine based on a measured speed and acceleration of the aircraft engine and is configured to detect the disturbance based on the identified flight phase.

16. The method according to claim 12, further comprising identifying the flight phase of the aircraft engine based on a measured speed and acceleration of the aircraft engine, wherein the detecting the disturbance is performed based on the identified flight phase.

* * * * *